(12) United States Patent
Matsuyama et al.

(10) Patent No.: US 8,705,813 B2
(45) Date of Patent: Apr. 22, 2014

(54) IDENTIFICATION DEVICE, IDENTIFICATION METHOD, AND STORAGE MEDIUM

(75) Inventors: Ichiro Matsuyama, Kawasaki (JP); Yuki Fukui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 13/162,250

(22) Filed: Jun. 16, 2011

(65) Prior Publication Data

US 2011/0311112 A1 Dec. 22, 2011

(30) Foreign Application Priority Data

Jun. 21, 2010 (JP) .................................. 2010-140529
Mar. 8, 2011 (JP) .................................. 2011-050037

(51) Int. Cl.
*G06K 9/00* (2006.01)

(52) U.S. Cl.
USPC ............................. 382/118; 348/169; 382/103

(58) Field of Classification Search
USPC .......... 348/169, 222.1, 333.01, 349; 382/117, 382/118, 103
See application file for complete search history.

(56) References Cited

U.S. PATENT DOCUMENTS

| | | | |
|---|---|---|---|
| 7,634,108 B2 * | 12/2009 | Cohen et al. ................... | 382/103 |
| 8,253,819 B2 * | 8/2012 | Ishii et al. .................. | 348/222.1 |
| 8,335,354 B2 * | 12/2012 | Matsuo et al. ................. | 382/118 |
| 8,340,366 B2 * | 12/2012 | Masuda et al. ................. | 382/118 |
| 8,396,262 B2 * | 3/2013 | Aisaka et al. .................. | 382/118 |
| 2004/0135788 A1 * | 7/2004 | Davidson et al. ............. | 345/530 |
| 2010/0067750 A1 * | 3/2010 | Matsuo et al. ................. | 382/118 |
| 2011/0311112 A1 * | 12/2011 | Matsuyama et al. .......... | 382/118 |

FOREIGN PATENT DOCUMENTS

| | | |
|---|---|---|
| JP | 2004-118592 A | 4/2004 |
| JP | 2007-179224 | 7/2007 |
| JP | 2007-310480 A | 11/2007 |
| JP | 2010-027035 | 2/2010 |
| JP | 2010-092442 A | 4/2010 |

OTHER PUBLICATIONS

The above foreign patent documents were cited in the Feb. 10, 2014 Japanese Office Action, which is enclosed without an English Translation, that issued in Japanese Patent Application No. 2010-140529.

* cited by examiner

*Primary Examiner* — Gregory M Desire

(74) *Attorney, Agent, or Firm* — Cowan, Liebowitz & Latman, P.C.

(57) ABSTRACT

An identification device capable of improving identification accuracy. The identification device performs identification according to a face area contained in image data. Feature data is extracted from a face area in each of frames of image data. The extracted feature data is registered in a person database section. Identification is performed through comparison between the feature data registered in the person database section and the extracted feature data. A tracking section identifies an identical face area in consecutive frames. If a face area is identified in a first frame, but a face area in a second frame following the first frame, which is identified by the tracking section as identical to the identified face area in the first frame, is not identified, the extracted feature data associated with the face area in the second frame is registered as additional feature data in the person database section.

14 Claims, 12 Drawing Sheets

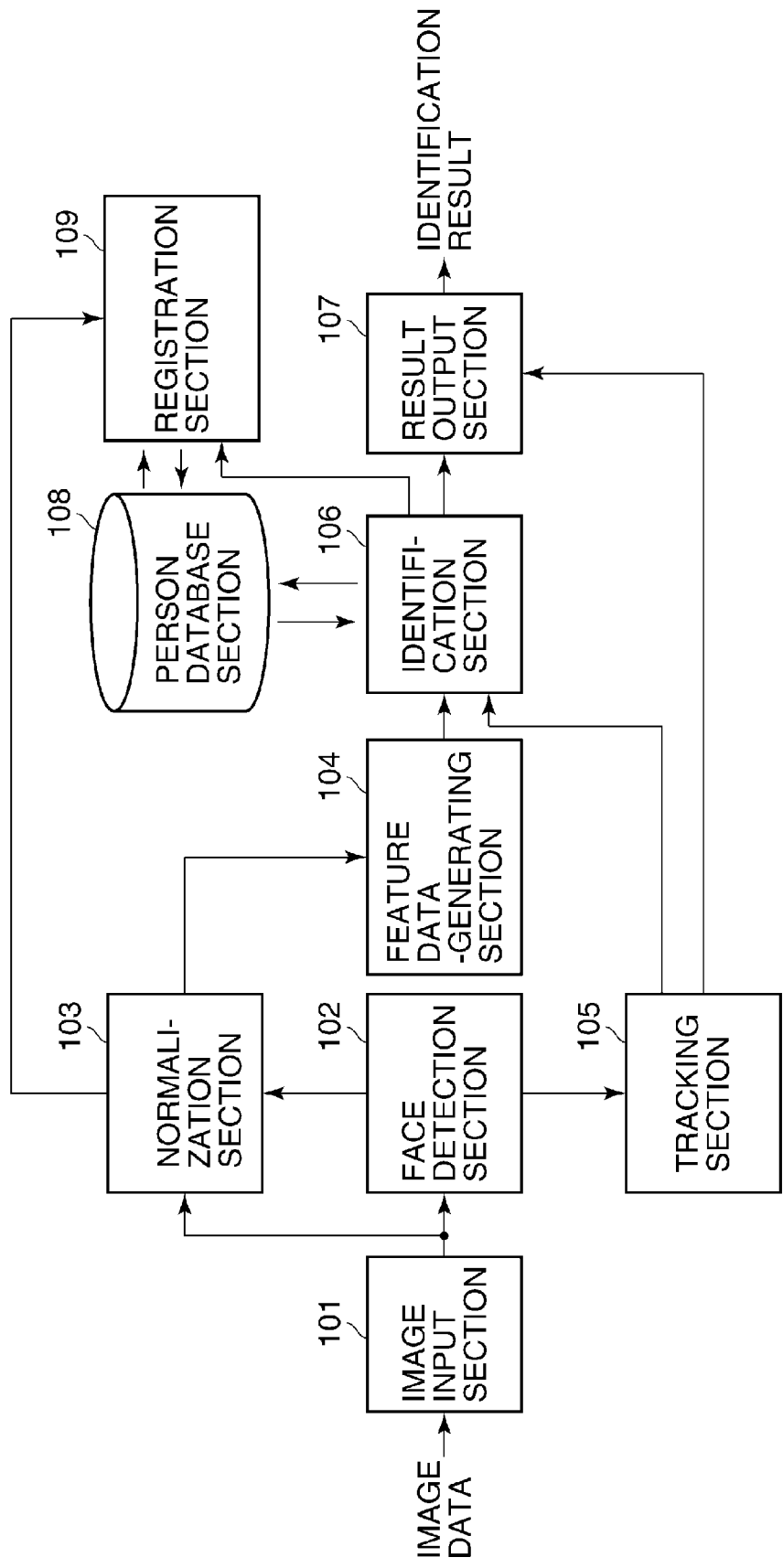

FIG.3

| PERSONAL ID | NAME | REGISTRATION ID | IMAGE | FEATURE DATA |
|---|---|---|---|---|
| 1 | "Koutaro" | 1 | A11 | C11 |
| | | 2 | A12 | C12 |
| | | 3 | A13 | C13 |
| 2 | "Rei" | 1 | A21 | C21 |
| | | 0 | | |
| | | 0 | | |
| 3 | "Rio" | 1 | A31 | C31 |
| | | 2 | A32 | C32 |
| | | 0 | | |
| 4 | "Sora" | 1 | A40 | C40 |
| | | 0 | | |
| | | 0 | | |

*FIG.5A*
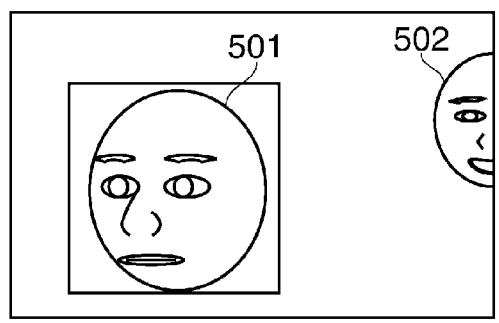
*FIG.5B*
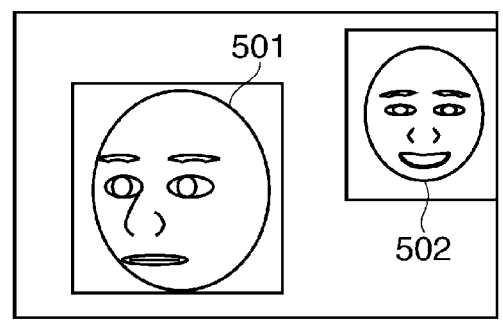
*FIG.5C*
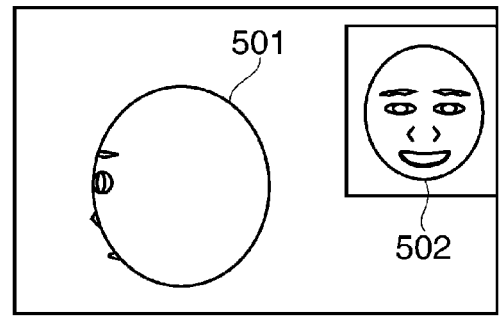

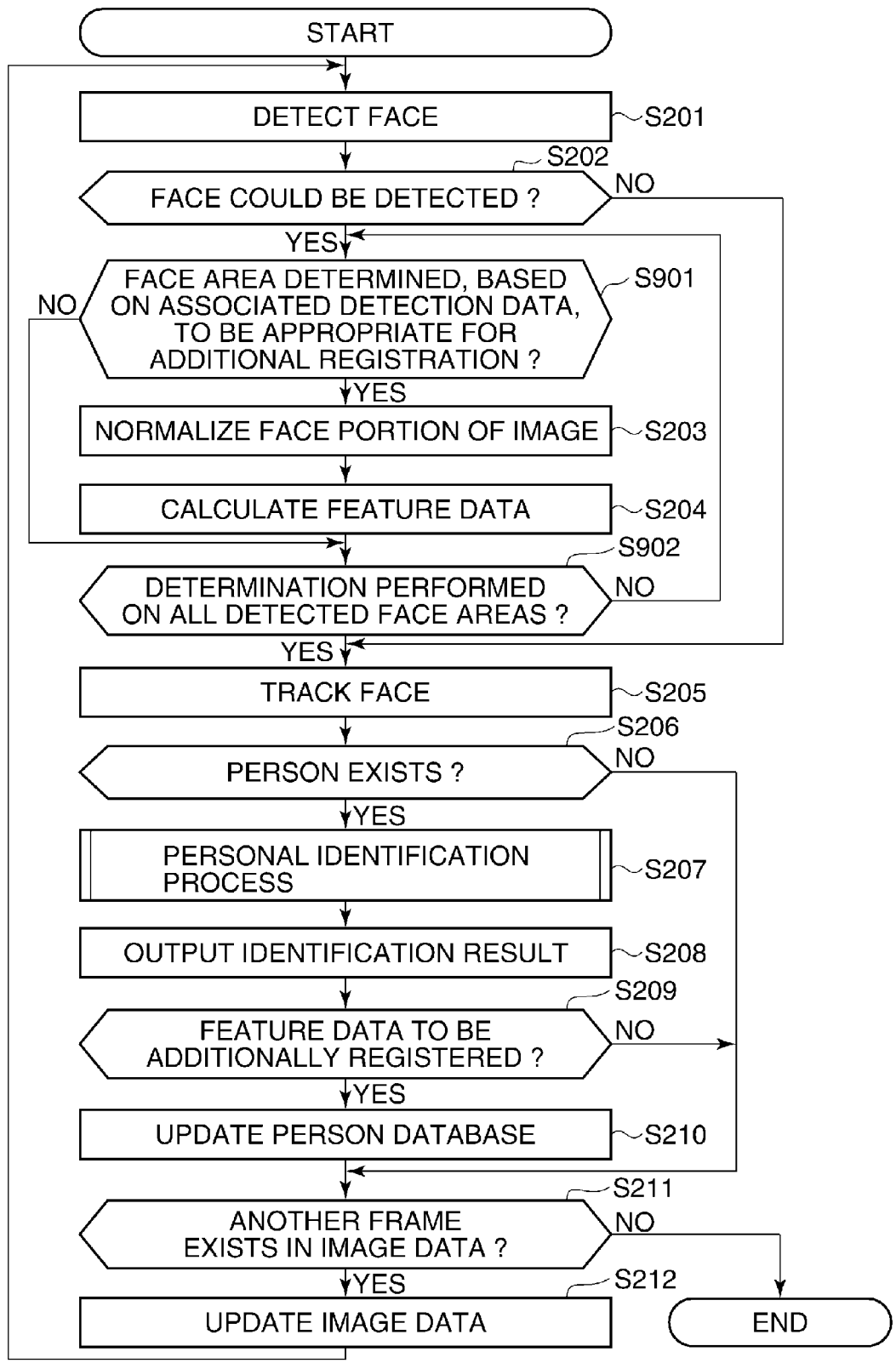

IDENTIFICATION DEVICE, IDENTIFICATION METHOD, AND STORAGE MEDIUM

BACKGROUND OF THE INVENTION

1. Field of the Invention

The present invention relates to an identification device, an identification method, and a storage medium, and more particularly to a technique of performing personal or individual identification by detecting a human face area from image data.

2. Description of the Related Art

There has generally been known a technique of performing personal identification using a face detection function. In this technique, face area feature data specific to each person is extracted from face image data, and a comparison is performed between feature data registered in advance and the extracted feature data. Then, it is determined, based on the result of the comparison, whether or not the face image data matches a registered person.

By the way, feature data is influenced by the facial expression and/or facing direction of a human face area and a situation including a lighting condition. For this reason, when there is a difference between a situation where feature data was extracted and registered and a situation where feature data is extracted from face image data for personal identification, accuracy in personal identification can be degraded.

In order to avoid the degradation of accuracy in personal identification, a method can be employed in which a facial expression is identified from a human face area and then identification is performed using a person database in which feature data of facial expressions is registered. In this method, if feature data corresponding to the identified facial expression has not been registered yet, the feature data is additionally registered (see Japanese Patent Laid-Open Publication No. 2010-27035).

Further, a method has been disclosed in which a plurality of face images continuously picked up from a person and a plurality of face images of the same person registered in advance in a person database are compared with a reference image selected from the face image, and a plurality of face images are selected based on the results of the comparison to thereby update face images in the person database (see Japanese Patent Laid-Open Publication No. 2007-179224).

However, in the method disclosed in Japanese Patent Laid-Open Publication No. 2010-27035, only when identification of a person has already been successful and a facial expression which has not been registered yet as feature data can be detected from the person, additional registration is performed. Consequently, when a change in facial expression and a facing direction of a face, which cannot be detected, or a change in other conditions, including the lighting condition, occurs, it is impossible to improve accuracy in identification.

On the other hand, according to the method disclosed in Japanese Patent Laid-Open Publication No. 2007-179224, face images selected for update vary with a reference image which is selected. This makes the accuracy in identification unstable. Further, whenever an image of a person (i.e. a human face) is picked up, processing for updating the person database is executed, which increases processing load.

SUMMARY OF THE INVENTION

The present invention provides an identification device and an identification method which are capable of improving accuracy in identification against any change in the state of a face area, with a small processing load, and a computer-readable storage medium storing a program implementing the identification method.

In a first aspect of the present invention, there is provided a An identification device that performs identification according to a face area contained in image data, comprising a feature data extraction unit configured to extract feature data from a face area in each of a plurality of frames of image data, as extracted feature data, a storage unit configured to register therein feature data for use in the identification, an identification unit configured to perform identification through comparison between the feature data registered in the storage unit and the extracted feature data, a tracking unit configured to identify an identical face area in consecutive ones of the frames, and a registration unit configured to be operable when the identification unit identifies a face area in a first frame as one of the frames, but the identification unit does not identify a face area in a second frame following the first frame, which is identified by the tracking unit as identical to the identified face area in the first frame, to register the extracted feature data associated with the face area in the second frame, as additional feature data, in the storage unit.

In a second aspect of the present invention, there is provided an identification method used by an identification device that performs identification according to a face area contained in image data and is provided with a storage unit in which feature data associated with a face area for use in the identification is registered as registered feature data, comprising extracting feature data from a face area in each of a plurality of frames of image data, as extracted feature data, performing identification through comparison between the feature data registered in the storage unit and the extracted feature data, identifying an identical face area in consecutive ones of the frames, and registering, when a face area in a first frame as one of the frames is identified but a face area in a second frame following the first frame, which is identified as identical to the identified face area in the first frame, is not identified, the extracted feature data associated with the face area in the second frame, as additional feature data, in the storage unit.

In a third aspect of the present invention, there is provided a non-transitory computer-readable storage medium storing a computer-executable program for causing a computer to execute an identification method used by an identification device that performs identification according to a face area contained in image data and is provided with a storage unit in which feature data associated with a face area for use in the identification is registered as registered feature data, wherein the identification method comprises extracting feature data from a face area in each of a plurality of frames of image data, as extracted feature data, performing identification through comparison between the feature data registered in the storage unit and the extracted feature data, identifying an identical face area in consecutive ones of the frames, and registering, when a face area in a first frame as one of the frames is identified but a face area in a second frame following the first frame, which is identified as identical to the identified face area in the first frame, is not identified, the extracted feature data associated with the face area in the second frame, as additional feature data, in the storage unit.

According to the invention, it is possible to improve accuracy in identification against a change in a shooting condition of an object to be identified, even when identification is performed based on image data having a plurality of frames.

The features and advantages of the invention will become more apparent from the following detailed description taken in conjunction with the accompanying drawings.

BRIEF DESCRIPTION OF THE DRAWINGS

FIG. 1 is a block diagram of a personal identification device according to a first embodiment of the present invention.

FIGS. 2A to 2C are views illustrating examples of feature data on a person's face used in the personal identification device shown in FIG. 1, in which FIG. 2A shows feature point coordinates constituting feature data on the person's face facing frontward; FIG. 2B shows feature point coordinates constituting feature data on the person's face whose facial expressions have been changed; and FIG. 2C shows feature point coordinates constituting feature data on the person's face of which the facing direction has been changed.

FIG. 3 is a diagram showing an example of a registration list including feature data for personal identification, which is stored in a person database section appearing in FIG. 1.

FIGS. 5A to 5C are views illustrating examples of moving image data processed by the personal identification device in FIG. 1, in which FIG. 5A shows one frame of the moving image data; FIG. 5B shows an example of a frame succeeding the FIG. 5A frame; and FIG. 5C shows another example of a frame succeeding the FIG. 5A frame.

FIGS. 9A to 9C are views useful in explaining additional registration executed by the personal identification device shown in FIG. 1, in which FIG. 9A shows one frame of moving image data; FIG. 9B shows an example of a frame succeeding the FIG. 9A frame; and FIG. 9C shows an example of data registered in the person database section appearing in FIG. 1.

FIG. 10 is a flowchart of a personal identification and database update process executed by the personal identification device in FIG. 8.

DETAILED DESCRIPTION OF THE EMBODIMENTS

Figure 2A:
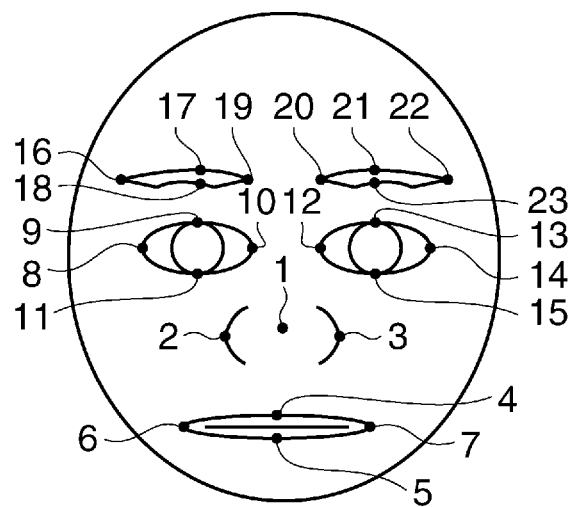

The present invention will now be described in detail below with reference to the accompanying drawings showing embodiments thereof.

FIG. 1 is a block diagram of a personal identification device according to a first embodiment of the present invention.

Referring to FIG. 1, the personal identification device has an image input section 101. At least image data obtained by photographing a human face is input from the image input section 101. This image data is delivered from the image input section 101 to a face detecting section 102 and a normalization section 103.

The face detecting section 102 detects the position and size of a human face area from the image data. For example, the face detecting section 102 extracts shapes corresponding to component elements, such as a nose, a mouth, and eyes, of the face area from the input image data. Then, the face detecting section 102 detects an area where the nose and the mouth exist, on an extension line passing on an intermediate portion between the two eyes. Further, the face detecting section 102 estimates the size of the face from the sizes of the eyes and a distance between the eyes, and detects an area enclosed around a position corresponding to the center of the nose within a range of an estimated size, as a face area. This face area is delivered from the face detecting section 102 to the normalization section 103 and a tracking section 105 as face area detection data.

The normalization section 103 cuts out the face area from the image data according to the face area detection data. For example, when the face area is inclined, the normalization section 103 rotates the face area to remove the inclination. Further, the normalization section 103 increases or reduces the face area e.g. to a predetermined size in which the distance between the two eyes becomes equal to a predetermined distance, to thereby normalize the face area as face image data having a predetermined angle and a predetermined size (hereinafter referred to as "the normalized face image data"). Then, the normalization section 103 delivers the normalized face image data to a feature data-generating section 104 and a registration section 109.

The feature data-generating section 104 extracts feature data from the normalized face image data. This feature data includes information on the specific shapes of the component elements of a human face, such as a mouth, eyes, eyebrows, and a nose, and the locations of the respective component elements, as disclosed e.g. in Japanese Patent Laid-Open Publication No. 2005-266981. The feature data is delivered from the feature data-generating section 104 to an identification section 106.

The feature data can be extracted from the normalized face image data using a method, such as edge detection using e.g. a neural network or a space filter. Note that the feature data may include not only information on shapes and locations, but also information on chroma and hue. As more feature data items are provided for a single human face, more detailed analysis of a look of the face can be performed, which improves accuracy in personal identification using the feature data.

When image data has a plurality of frames, as in the case of moving image data, face areas are detected in the respective frames at a predetermined repletion period. In short, the face detecting section 102 detects a face area on a frame-by-frame basis at the predetermined repetition period. The tracking section 105 determines whether or not a face area detected in one frame and a face area detected in another frame belong to the same person.

For example, when a plurality of human faces are detected from image data of one frame and one or more human faces are also detected from image data of another frame, the tracking section (tracking unit) 105 judges that human faces similar in size and location belong to the same person. When no face area similar to that detected in the one frame can be detected in the other frame, the tracking section 105 performs tracking by searching for a nearby area similar in a pattern of luminance and color difference to the face area detected in the one frame. A result of the determination by the tracking section 105 is delivered to the identification section 106 and a result output section 107.

In a person database section (storage unit or storage device) 108, there are registered a plurality of feature data items for personal identification, together with normalized face image data, as registered feature data. The identification section (identification unit) 106 accesses the person database section 108 to read out the feature data (registered feature data) for personal identification. Then, the identification section 106 performs personal identification by comparing and collating between the registered feature data and the feature data of the face area extracted by the feature data-generating section 104 (hereinafter referred to as "extracted feature data"). A result of this collation is delivered from the identification section 106 to the result output section 107. The result output section 107 outputs an identification result according to the result of collation.

During the comparison and collation, the identification section 106 determines whether or not to perform additional registration. If it is determined that additional registration is to be performed, the identification section 106 delivers the extracted feature data to the registration section 109. Then, the registration section 109 additionally registers feature data, which is determined by the identification section 106 that the feature data is to be additionally registered, in the person database section 108 together with the normalized face image data.

Note that the identification section 106 performs identification according to a determination result sent from the tracking section 105, and the result output section 107 outputs an identification result according to the determination result sent from the tracking section 105.

The personal identification device shown in FIG. 1 may be formed by a single device or a system comprising a plurality of devices. For example, a single unit of a digital camera or digital video camera may incorporate all the component elements of the personal identification device.

Alternatively, a digital camera or a digital video camera may have only the image input section 101 disposed therein, and in this case, the other component elements of the personal identification device may be provided in an external computer communicable with the digital camera or the digital video camera.

Further, the component elements of the personal identification device shown in FIG. 1 may be separately provided in a plurality of computers on a network in a divided manner, and in this case, a computer provided with the image input section 101 may receive image data from other external apparatuses or devices or a storage medium.

Figure 2B:
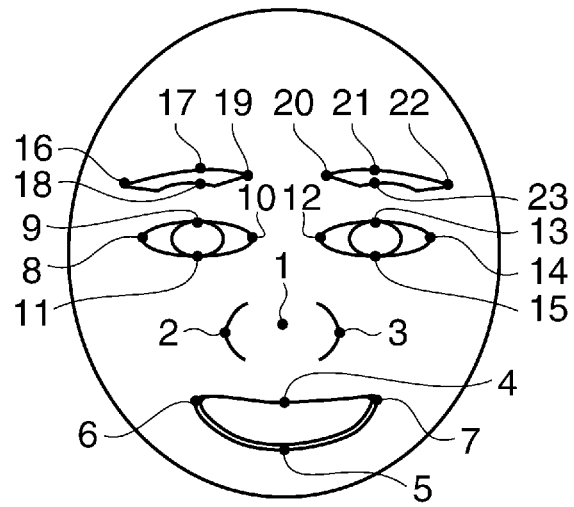
Figure 2C:
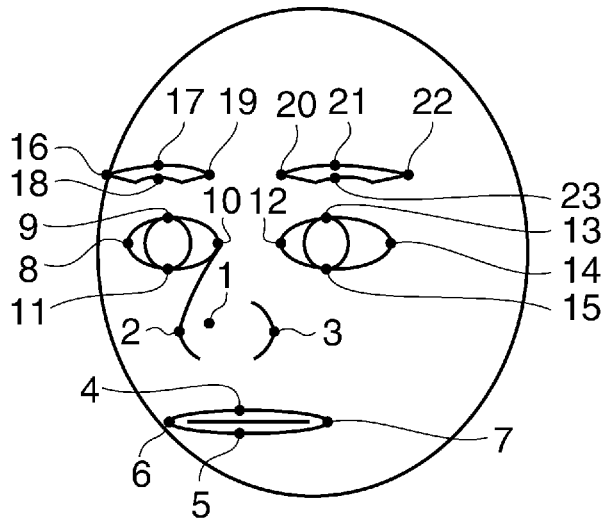

FIGS. 2A to 2C are views illustrating examples of feature data used in the personal identification device shown in FIG. 1. FIG. 2A shows feature point coordinates constituting feature data on a person's face facing frontward, and FIG. 2B shows feature point coordinates constituting feature data on the person's face whose facial expressions have been changed. Further, FIG. 2C shows feature point coordinates constituting feature data on the person's face of which the facing direction has been changed.

Referring to FIGS. 2A to 2C, in the present example, the coordinates of a total of twenty-three feature points are used for feature data for personal identification as shown in FIG. 2A. Although many more feature points are needed for actually performing personal identification, in the illustrated example, the following description is given assuming that only the twenty-three feature points are used, for simplicity.

The coordinates of the twenty-three feature points are calculated, using face image data normalized based on the distance between the two eyes, for locations of extracted eyes, nose, mouth, and eyebrows. These coordinates are determined e.g. with reference to the location of an end point of the nose. The identification section 106 sets the coordinates of each feature point calculated from input image data as Pi (i=1, 2, ..., 23). Then, the identification section 106 calculates the sum S $(=\Sigma|Pi-P'i|)$ of absolute values of the differences between the coordinates Pi and coordinates P'i of feature points of a face area registered in advance in the person database section 108.

The identification section 106 determines that as the absolute value sum S is smaller, a person for detection (i.e. a face area) and a person registered in advance has a higher possibility of being identical to each other. When the absolute value sum S associated with a person who is determined, by the comparison and collation of feature data, to have a highest possibility of being identical, is smaller than a predetermined threshold value, the identification section 106 determines that the person for detection is the registered person. On the other hand, if the absolute value sum S is not smaller than the threshold value, the identification section 106 determines that there is no registered person identical to the person for detection.

Note that the method using the absolute value sum S is only an example of the method of personal identification, and a different method may be used for personal identification. For example, a person may be identified based on locations of his/her eyes and mouth after a change in facial expressions and a pattern of a change in shapes.

Further, a synthetic final personal identification result may be obtained according to results of comparison and collation with a plurality of feature data items. More specifically, insofar as collation is performed using feature data registered in advance in the person database section 108 so as to identify a person having a highest possibility of being identical to the person for detection, any other method may be employed to provide the same advantageous effect as described above.

By the way, the above-described personal identification is performed using feature points extracted from image data, and hence when the facial expressions or facing direction of a person (i.e. his/her face) change, the feature point coordinates change as shown in FIG. 2B or 2C. As a result, the value of the absolute value sum S sharply changes, which causes degradation of accuracy in personal identification.

Further, changes in various shooting conditions, such as a lighting condition and a background, influence accuracy in personal identification. To cope with the influence, it is only required to register, in advance, a plurality of feature data items obtained by shooting the same person under various conditions, in the person database section 108, and calculate an absolute value sum S concerning these feature data items in association with each condition. This makes it possible to identify a person with higher accuracy even when a shooting condition changes.

However, it takes time and labor to shoot a person in advance under various conditions, and equipment for illumination and so forth may be required depending on a case. In contrast, in the illustrated example, simply by registering feature data on a person shot under a single condition in the person database in advance, it is possible to automatically perform personal identification and additional registration of feature data to thereby improve accuracy in identification.

FIG. 3 is a diagram showing an example of a registration list including feature data for personal identification, which is stored in the person database section 108 appearing in FIG. 1.

Referring to FIG. 3, a plurality of feature data items are registered in the person database section 108 (particularly the registration list) in association with each person. Each of persons registered in the person database section 108 is assigned a personal ID. A plurality of feature data items are registered in association with each of the personal IDs, and a registration ID is assigned to each of the feature data items.

In the FIG. 3 example, a registration ID of 1 indicates that an associated feature data item has been registered in advance by a user, and a registration ID of 0 indicates that an associated feature data item has not been registered yet. The other registration IDs indicate that associated feature data items have been additionally registered automatically by the personal identification device shown in FIG. 1.

In the present embodiment, face image data normalized by the normalization section 103 is also registered in the person database section 108 in association with each feature data item, as described hereinbefore, so that the user can check the face image data and erase an unnecessary feature data item. For example, a normalized face image data item identified by a registration ID of 1 of "Koutaro" associated with a personal ID of 1 is represented by A11, and feature data extracted from the face image data item A11 is represented by C11.

Note that personal identification can be performed if either face image data or feature data has been registered in advance. If face image data has been registered, it is possible to perform personal identification while generating feature data from the face image data. Further, although in the FIG. 3 example, the upper limit number of the registration ID associated with each personal ID is set to 3, the upper limit number is only required to be not smaller than 2. Furthermore, the upper limit number may be set not on a personal ID-by-personal ID basis, but may be set for the total number of registration IDs of data stored in the entire person database section 108.

Figure 4:
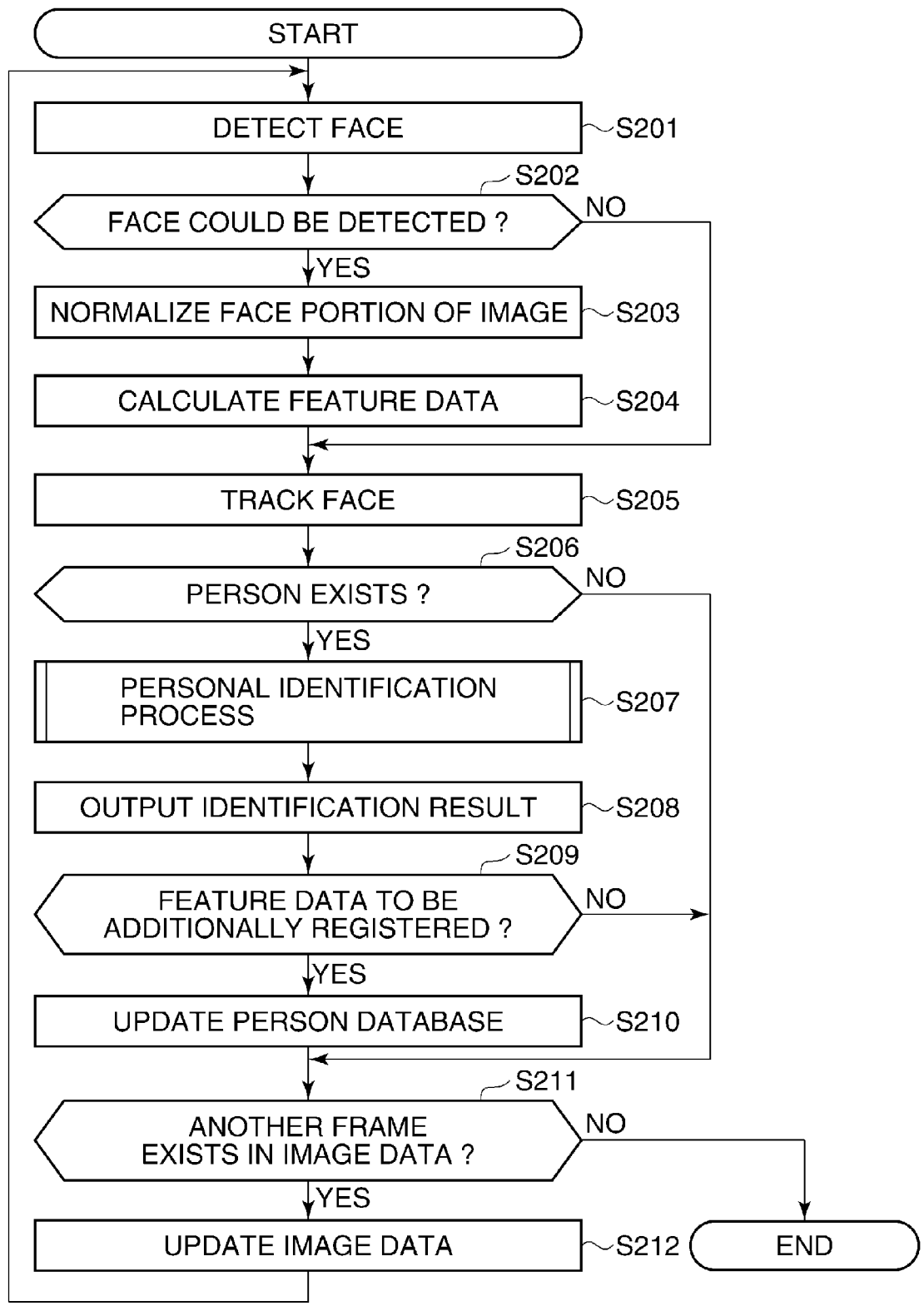
FIG. 4 is a flowchart of a personal identification and database update process executed by the personal identification device in FIG. 1.

FIG. 4 is a flowchart of a personal identification and database update process executed by the personal identification device in FIG. 1.

Referring to FIGS. 1 and 4, when image data is input to the image input section 101, the personal identification device starts the personal identification and database update process. If the image input section 101 is implemented by a camera, image data obtained through shooting by the camera or read out from a storage medium mounted in the camera is input to the personal identification device. On the other hand, if the image input section 101 is implemented by a personal computer, image data read out from a storage medium or image data received via a network is input to the personal identification device.

In the following description, it is assumed that moving image data is input to the image input section 101, and personal identification is continuously performed at frame intervals corresponding to time required for personal identification.

First, the face detection section 102 receives image data for one frame of the moving image data from the image input section 101 and performs detection of human face areas (step S201). Then, the face detection section 102 determines whether or not face areas could be detected (step S202). If it is determined that one or more face areas could be detected (YES to the step S202), the normalization section 103 normalizes each of the one or more face areas cut out from the image data, based on the result of the detection by the face detection section 102 (step S203).

Then, the feature data-generating section 104 calculates feature data including the feature point coordinates, described with reference to FIG. 5, according to normalized face image data (step S204). The tracking section 105 receives the result of the face area detection from the face detection section 102 and determines whether or not face areas detected or determined in different frames include faces which can be determined to belong to the same person, based on face central positions and respective associated face sizes (face tracking: step S205).

The tracking section 105 compares between the central positions and associated sizes of the face areas detected in the respective frames and presumes that face areas detected in consecutive frames and having a smallest sum of differences in central position and size belong to the same person. For example, the tracking section 105 compares between face areas detected in a first frame and a second frame different from the first frame to thereby identify face areas belonging to the same person (individual).

However, even when the sum is smallest, if the value is not within a predetermined threshold range, the tracking section 105 determines that the face areas do not belong to the same person.

If it is determined in the step S202 that no face area could be detected (NO to the step S202), the process proceeds from the step S202 to the step S205.

In this case, the tracking section 105 detects from a frame being currently processed, an area similar to a face area detected in a frame preceding the frame by the face detection section 102 or an area determined to be a face area in the preceding frame by the tracking section 105, and determines the detected area is a face area of the same person. Specifically, when a face area has a highest degree of similarity in a pattern of luminance and color difference and at the same time a value indicative of the similarity is within a predetermined threshold range, it is determined that the face area belongs to the same person to whom the face area in the preceding frame belongs.

FIGS. 5A to 5C are views illustrating examples of moving image data to be processed by the personal identification device in FIG. 1. FIG. 5A shows one frame of the moving image data, and FIG. 5B shows an example of a frame succeeding the FIG. 5A frame. Further, FIG. 5C shows another example of the frame succeeding the FIG. 5A frame.

Now, it is assumed that the face area of a person 501 has been detected in FIG. 5A, and the face area of the person 501 and that of a person 502 have been detected in FIG. 5B. The tracking section 105 compares the face areas of the respective persons 501 and 502 detected in FIG. 5B with that of the person 501 detected in FIG. 5A. As a result, the tracking section 105 determines that the FIG. 5B face area of the person 501 and the FIG. 5A face area of the person 501 between which there is little difference in central position and size of the face area and the difference falls within the predetermined threshold range belong to the same person.

On the other hand, when no face area has been detected or when face areas that can be determined to belong to the same person have not been detected, the tracking section 105 searches a different frame for a nearby area having a pattern of luminance and color difference similar to that of the face area detected by the face detection section 102.

Now, it is assumed that only the face area of the person 501 has been detected in FIG. 5A, and only the face area of the person 502 has been detected in FIG. 5C. The tracking section 105 compares the face area of the persons 502 appearing in FIG. 5C with that of the person 501 appearing in FIG. 5A. As a result, there is a large difference in central position and size between the two face areas and the difference does not fall within the predetermined threshold range, and hence the tracking section 105 determines that the persons 501 and 502 are different from each other.

Accordingly, the tracking section 105 searches the FIG. 5C frame for a nearby area having a pattern of luminance and color difference similar to that of the face area of the person 501 detected in FIG. 5A. By searching the FIG. 5C frame, the tracking section 105 presumes that the face area of the same person exists in an area most similar to the face area in FIG.

5A. However, when the degree of similarity does not fall within the predetermined threshold range, the tracking section 105 determines that the same person does not exist. Note that the person 501 in FIG. 5C faces backward and since the degree of similarity to the person 501 in FIG. 5A falls out of the threshold range, it is determined that the person 501 does not exist in FIG. 5C.

Further, the tracking section 105 assigns a personal figure ID unique to each person determined to be identical through a plurality of consecutive frames. Whenever a new person is detected, a personal figure ID is assigned to the person anew, and whenever a person disappears, a personal figure ID having assigned to the person is deleted.

For example, referring to the consecutive frames illustrated in FIGS. 5A and 5B, the person 501 in FIG. 5A has already been assigned a personal figure ID, and the face area of the person 502 detected in FIG. 5B is regarded as a new person and assigned a new personal figure ID different from that assigned to the person 501.

Referring again to FIGS. 1 and 4, the identification section 106 determines whether or not a person exists, based on the result of the face area detection and the result of the tracking (step S206). If it is determined that at least one person exists in the image data (YES to the step S206), the identification section 106 performs comparison and collation between the feature data of face areas and the feature data registered in the person database section 108, on a basis of each personal figure ID assigned to the face area by the tracking section 105. Thus, the identification section 106 performs personal identification by determining who each face area belongs to (step S207).

The identification section 106 holds correspondence between personal figure IDs and personal IDs, as described hereinafter. The identification section 106 collates each of the personal figure IDs against each of the personal IDs and each of the registration IDs registered in the person database section 108. Then, when a person associated with the personal figure ID is identified, the identification section 106 updates i.e. newly sets or maintains association between a personal ID and the personal figure ID.

Further, the identification section 106 determines whether or not to additionally register feature data associated with the personal figure ID in the person database section 108. Note that the personal identification process executed in the step S1207 will be described in detail hereinafter.

Then, the result output section 107 receives the result of the personal identification from the identification section 106 and displays the identification result in a manner superimposed upon an image generated from the image data for personal identification (step S208).

Note that the method of displaying the identification result is not limited to the above-mentioned method, but various other methods can be employed. Further, when personal identification is simultaneously performed on a plurality of face areas, it is desirable to make clear correspondences between identification results and the respective face areas.

The identification section 106 determines whether or not there is a personal figure ID associated with feature data which is to be additionally registered in the person database section 108 (step S209). If there is a personal figure ID associated with feature data which is to be additionally registered (YES to the step S209), the registration section 109 additionally registers the determined feature data in the person database section 108 as additional feature data (step S210).

Then, the image input section 101 determines whether or not the image data has another frame (step S211). If the image data has another frame (YES to the step S211), the image input section 101 updates the image data to the frame (step S212). Then, the process returns to the step S201, wherein the face detection section 102 performs face detection on the updated image data. On the other hand, if the image data has no more frame (NO to the step S211), the process is terminated.

Note that if it is determined in the step S206 that no person exists in the image data (NO to the step S206), the process directly proceeds to the step S211. Further, if it is determined in the step S209 that there is no personal figure ID associated with feature data which is to be additionally registered (NO to the step S209), the process directly proceeds to the step S211.

Figure 6:
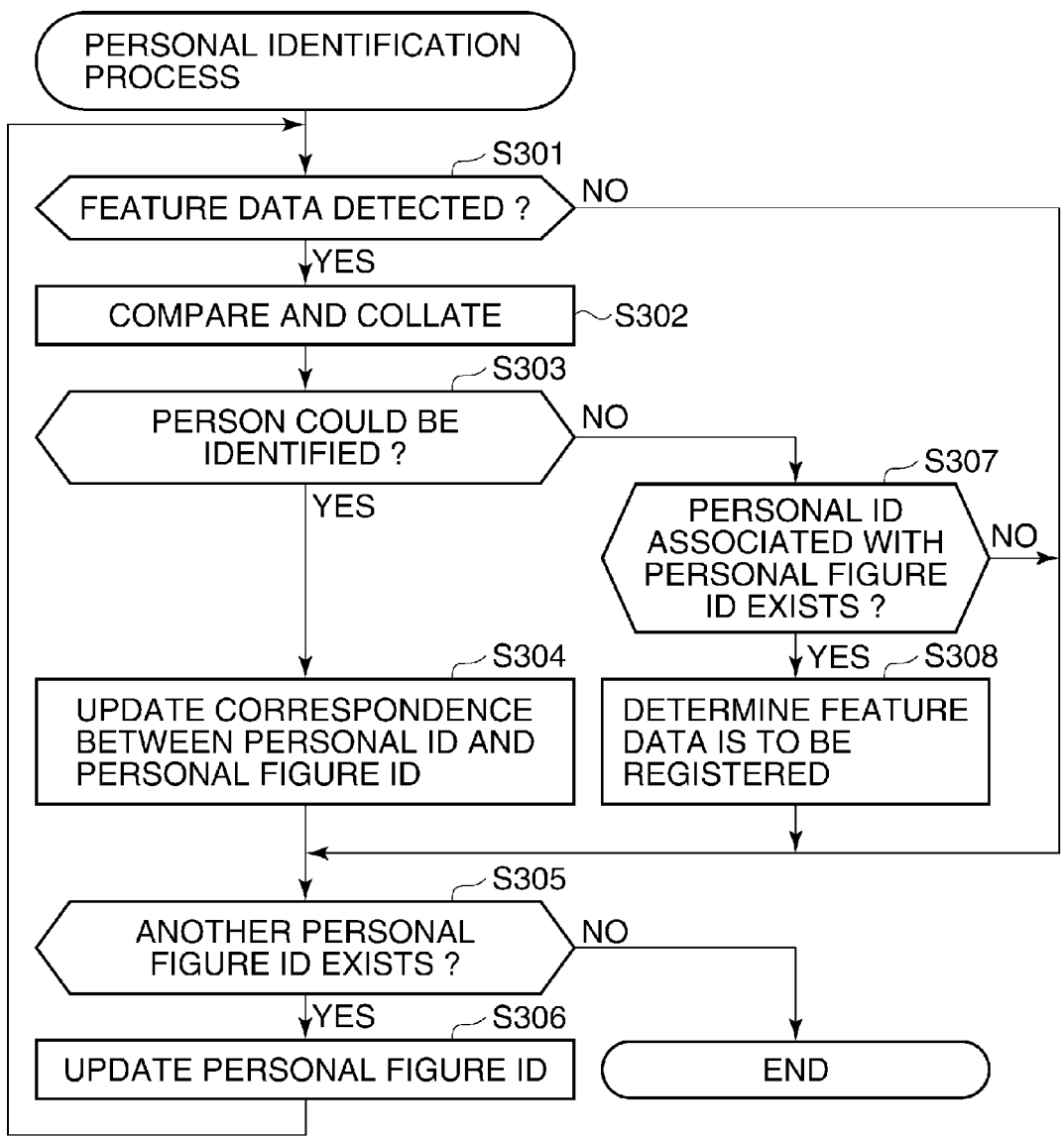
FIG. 6 is a flowchart of a personal identification process executed in the personal identification and database update process described with reference to FIG. 4.

FIG. 6 is a flowchart of the personal identification process executed in the step S207 in FIG. 4.

Referring to FIGS. 1 and 6, the identification section 106 associates a personal figure ID assigned to a face area by the tracking section 105 and a personal ID registered in the person database section 108 with each other, and manages the correspondence between the two IDs over consecutive frames. Further, the identification section 106 determines whether or not to additionally register feature data associated with the personal figure ID in the person database section 108.

First, the identification section 106 determines whether or not feature data associated with a personal figure ID has been detected in a frame being currently processed (step S301). A case where feature data has not been detected corresponds to a case where the face detection section 102 cannot detect any face area but the tracking section 105 determines an area where there is a face by tracking.

If the feature data has been detected (YES to the step S301), the identification section 106 compares and collates between the feature data associated with the face area (extracted feature data) and feature data registered in the person database section 108 (registered feature data) by the above-described personal identification method including the method using the absolute value sum S, to thereby perform personal identification (step S302). Then, the identification section 106 determines whether or not personal identification could be performed, i.e. whether or not a person could be identified (step S303).

If a person could be identified (YES to the step S303), the identification section 106 updates the correspondence between the personal figure ID and the personal ID based on the result of the personal identification (step S304). More specifically, when the correspondence is determined anew, the association is set anew, whereas when the correspondence is already determined, the association is maintained. Then, the identification section 106 determines whether or not there remains a face area in the frame being currently processed, which has been assigned a personal figure ID by the tracking section 105 and not yet subjected to identification processing (step S305).

If there is a personal figure ID yet to be subjected to identification processing (YES to the step S305), the identification section 106 updates the personal figure ID to be processed (step S306), and the process returns to the step S301, wherein it is determined whether or not there is feature data associated with the updated personal figure ID. On the other hand, if all personal figure IDs have been subjected to identification processing (NO to the step S305), the identification section 106 terminates the personal identification process, followed by the main routine proceeding to the step S208 described with reference to FIG. 4.

If it is determined in the step S303 that no person could be identified (NO to the step S303), the identification section 106 determines whether or not there is a personal ID associated with the personal figure ID (step S307). If there is a personal ID associated with the personal figure ID (YES to the step S307), the identification section 106 determines that feature data associated with the personal figure ID in the frame being currently processed should be additionally registered in the person database section 108 (particularly the registration list) (step S308). In other words, the identification section 106 determines that the feature data is to be registered. Then, the process proceeds to the step S305.

That there is a personal ID associated with a personal figure ID means that personal identification for the personal figure ID was already successful in a frame preceding a frame being currently processed. If the identification section 106 fails in personal identification for the personal figure ID in the frame being currently processed despite the success of personal identification in the preceding frame, the fact indicates extracted feature data from the frame being currently processed cannot be covered by registered feature data associated with the person. Therefore, extracted feature data from the frame being currently processed is additionally registered in the person database section 108 as new registered feature data associated with the personal figure ID, whereby accuracy in personal identification can be improved.

Thus, whenever the identification section 106 fails in personal identification for a personal figure ID on which personal identification has already been successfully performed in a preceding frame, due to changes in the lighting conditions and/or face facing direction, new feature data is additionally registered in the person database section 108. As a consequence, feature data items dependent on various lighting conditions and face facing directions are additionally registered in the person database section 108, which makes it possible to improve accuracy in personal identification with ease even when a shooting condition changes.

For example, in the step S308, when feature data of personal figure ID associated with a personal ID of 2 is additionally registered in the person database section 108 described with reference to FIG. 3, the registration section 109 overwrites a registration ID of 0 as one of registered elements associated with a personal ID of 2, with a registration ID of 2, and registers feature data of the personal figure ID together with normalized image data.

If there is no personal ID associated with the personal figure ID (NO to the step S307), the process directly proceeds to the step S305. A case where there is no personal ID associated with a personal figure ID is a case where a person associated with the personal figure ID has never been identified based on the person database section 108. Note that if it is determined in the step S301 that no feature data has been detected (NO to the step S301), the process also directly proceeds to the step S305.

As described above, according to the first embodiment, it is possible to improve accuracy in personal identification with ease even when a shooting condition changes.

Next, a second embodiment of the present will be described in which only person's feature data which is high in reliability of personal identification is additionally registered. In the present embodiment, a personal identification device additionally registers only person's feature data which is higher in reliability of personal identification, so as not to register feature data on a wrong person in association with a person. Note that the personal identification device of the present embodiment is identical in construction to the personal identification device shown in FIG. 1, and therefore description thereof is omitted, with the same reference numerals denoting the same component elements, respectively.

In the personal identification device of the second embodiment, the identification section 106 makes identification results different in reliability, using two threshold values different from each other. More specifically, the identification section 106 performs comparison and collation between feature data items using the two threshold values, and selects only a feature data item with a highly reliable identification result for additional registration.

Specifically, the identification section 106 uses the two threshold values A and B corresponding to respective different reliability degrees of identification in performing comparison and collation between face area feature data and feature data registered in the person database section 108, in the step S302 in the personal identification process described with reference to FIG. 6. In the present example, the threshold value A (second threshold value) is set to be smaller than the threshold value B (first threshold value).

In the personal identification device of the second embodiment, during the personal identification, the identification section 106 calculates the absolute value sum S of differences between feature point coordinates, as in the first embodiment. Then, if the absolute value sum S associated with a person who is determined to have a highest possibility of being identical is smaller than the threshold value B, the identification section 106 determines that the person is identified, i.e. a person for detection (i.e. a face area) and a person registered in advance are identical to each other.

Further, if the absolute value sum S is smaller than the threshold value A (smaller than the threshold value B), the identification section 106 determines with a higher reliability that the person is identified. Once a personal figure ID has been identified with this higher degree of reliability, the identification section 106 holds the higher reliability of the personal figure ID until a personal ID associated with the personal figure ID is changed.

Further, in the present embodiment, in the step S308 of the personal identification process described with reference to FIG. 6, when the identification section 106 determines that the feature data associated with the personal figure ID is to be registered in the person database section 108, it is preconditioned that personal identification for the personal figure ID has been successfully performed with the aforementioned higher degree of reliability. When the personal identification for the personal figure ID has not been successfully performed with the higher degree of reliability, the identification section 106 by no means issues an instruction for additional registration to the registration section 109.

Figure 7:
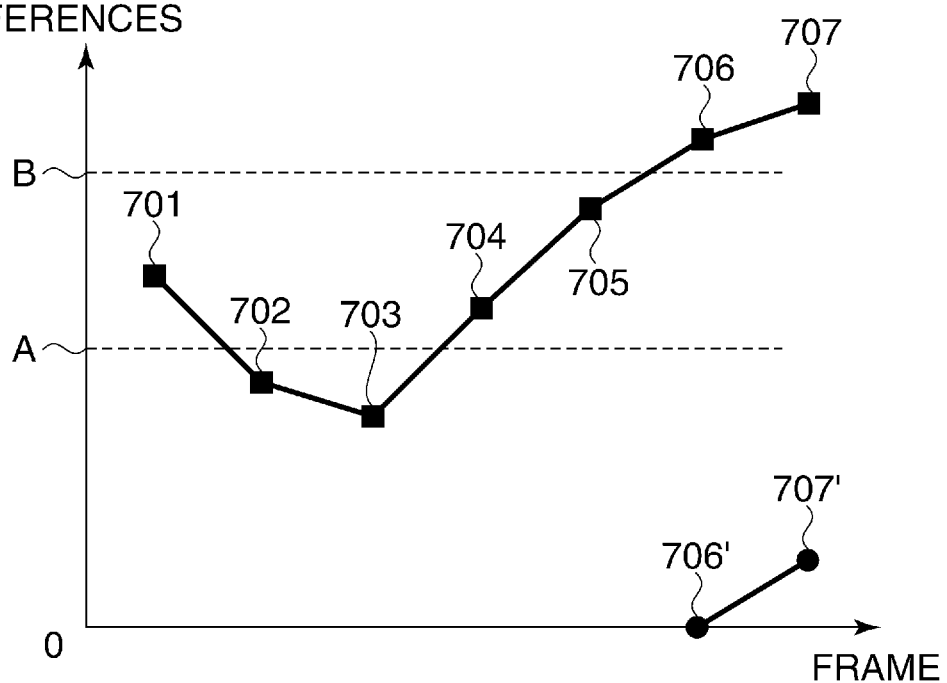
FIG. 7 is a diagram illustrating changes of a personal identification result obtained by a personal identification device according to a second embodiment of the present invention.

FIG. 7 is a diagram illustrating changes of the personal identification result obtained by the personal identification device according to the second embodiment.

FIG. 7 shows changes, during tracking through seven consecutive frames, in the absolute value sum S of differences between face area feature data associated with a personal figure ID assigned to face areas determined to belong to the same person by the tracking section 105 and feature data registered in the person database section 108.

Each of black squares 701 to 707 represents the absolute value sum S of differences between the face area feature data associated with the personal figure ID in the seven consecutive frames and a feature data item C21 (see FIG. 3). More specifically, each of the black squares 701 to 707 represents the absolute value sum S of differences in coordinates between feature points. Now, it is assumed that insofar as the black squares 701 to 706 are concerned, the absolute value sum S of differences from the feature data item C21 is smaller than the absolute value sum S of differences from any other of the feature data items registered in the person database section 108.

As for the black square 701, the absolute value sum S represented by the black square 701 is smaller than the threshold value B, and therefore the person is identified as a person assigned a personal ID of 2 in the associated frame corresponding to the black square 701. As for the black square 702, the absolute value sum S represented by the black square 702 is smaller than the threshold value A, and therefore the person is treated as a person with the higher reliability of personal identification insofar as the tracking section 105 keeps track of the person in frames following the associated frame corresponding to the black square 702.

On the other hand, as for the black square 706, the absolute value sum S represented by the black square 706 is larger than the threshold value B, and therefore the identification section 106 determines that feature data of a face area on a person detected in the associated frame corresponding to the black square 706 should be additionally registered in the person database section 108. Assuming that the feature data is denoted by C22 and normalized face image data by A22, the registration section 109 additionally registers the feature data C22 as a registration ID of 2 associated with the personal ID of 2 in the person database section 108 together with the normalized face image data A22.

In FIG. 7, each of black circles 706' and 707' represents the absolute value sum S of differences between feature data of face areas associated with the personal figure ID and the feature data C22 additionally registered from the frame corresponding to the black square 706. In a frame corresponding to the black circle 707', an absolute value sum S associated with the additionally registered feature data C22 becomes smallest among the feature data items registered in the person database section 108 in place of the feature data C21.

Although in the second embodiment, the two threshold values A and B different in reliability of personal identification are used as threshold values for the absolute value sum S, a threshold value for any other indicator may be used insofar as the degree of reliability of personal identification can be measured.

Further, in the second embodiment, when an absolute value sum S associated with a person becomes smaller than the threshold value B, it is determined that the person is identified. However, only when the absolute value sum S becomes smaller than the threshold value A, the result output section 107 may output a determination result indicating that the person is identified i.e. a person for detection (i.e. a face area) and a person registered in advance are identical to each other, so as to avoid output of an erroneous determination result.

Furthermore, although in the second embodiment, feature data registered in response to user instruction and additionally registered feature data are equally handled, additional registration may be performed only when personal identification has been performed on the former feature data with the higher reliability, so as to avoid erroneous additional registration.

As described above, according to the second embodiment, it is possible to additionally register only highly reliable feature data to thereby improve accuracy in personal identification.

Next, a third embodiment of the present invention will be described in which personal identification is performed while distinguishing between feature data registered in advance in the person database section 108 in response to user instruction and feature data additionally registered in the person database section 108. In the present embodiment, a personal identification device performs personal identification using only the feature data registered in advance in the person database section 108 in response to user instruction (data registered by instruction), and the additionally registered feature data (additionally registered data) is used for personal identification only when no person is found who can be identified by the data registered by instruction. Note that the personal identification device of the present embodiment is identical in configuration to the personal identification device shown in FIG. 1, and therefore description thereof is omitted, with the same reference numerals denoting the same component elements, respectively.

Specifically, the personal identification device of the present embodiment includes an instruction section (not shown in FIG. 1) via which a user instructs the personal identification device to register feature data. In response to an instruction received via the instruction section, the identification section 106 selects a designated face area from face areas detected by the face detection section 102 in a designated frame. Then, the registration section 109 registers feature data of the face area in the person database section 108 together with a person's name and normalized face image data. The feature data registered at this time is assigned a registration ID of 1.

Further, in the step S302 of the personal identification process described with reference to FIG. 6, first, the identification section 106 performs comparison and collation between feature data of face areas (extracted feature data) and feature data assigned a registration ID of 1 and registered in the person database section 108. In this step, only when no extracted feature data is found which matches the feature data assigned a registration ID of 1, the identification section 106 performs comparison and collation between feature data assigned a registration ID of a number larger than 1 and additionally registered in the person database section 108 and the extracted feature data.

As described above, according to the third embodiment, since comparison and collation is performed again using feature data additionally registered when no matching feature data items are found, it is possible to reduce the frequency of erroneously identifying a wrong person.

Next, a fourth embodiment of the present invention will be described in which the number of feature data items that can be registered in the person database section 108 has already reached an upper limit. In the present embodiment, a utilization frequency is also registered in the person database section 108 in association with each feature data item. The registration section 109 overwrites a feature data item utilized less frequently with a feature data item additionally registered anew. Note that the personal identification device of the present embodiment is identical in configuration to the personal identification device shown in FIG. 1, and therefore description thereof is omitted, with the same reference numerals denoting the same component elements, respectively.

Specifically, in association with each of feature data items registered for personal identification in the person database section 108 described with reference to FIG. 3, the number of times of matching with feature data of a face area detected by the face detection section 102 (number of matching times) and a date and time at which a match occurred last time (final match date and time) are registered.

Further, when a personal ID associated with a personal figure ID is updated in the step S304 of the personal identification process described with reference to FIG. 6, the identification section 106 updates a utilization frequency associated with a feature data item associated the personal ID in the person database section 108.

More specifically, the utilization frequency is updated in the step S304 when a personal figure ID is associated with a personal figure ID anew or when the existing association therebetween is maintained. In this case, the identification section 106 increments the number of times of matching of the feature data item in the person database section 108 with the feature data of the personal figure ID, and further updates the final match date and time to the present date and time.

Further, before additionally registering a feature data item in the person database section 108 in the step 210 of the personal identification and database update process in FIG. 4, if the number of feature data items that can be registered in the person database section 108 has already reached the upper limit, the registration section 109 additionally registers the feature data item by overwriting a registered feature data item having been utilized less frequently. In other words, when the number of feature data items that can be registered in the person database section 108 has reached the predetermined upper limit in registering an additional feature data item anew in the person database section 108, i.e. the registration list, a registered feature data item having been utilized less frequently is deleted, and then the additional feature data item is registered.

Now, a feature data item whose final match date and time is older than that of any other feature data item which has a matching frequency below a predetermined threshold value is regarded as one having been utilized less frequently. Note that the weighting of the utilization frequency may be performed such that the final match date and time is given priority over the matching frequency (number of times of matching), or alternatively that history of identification reliability in matching with feature data associated with detected face areas is taken into account.

However, a feature data item which is registered by the user and is assigned a registration ID of 1 is by no means updated. For this reason, the update of the utilization frequency and the search for a feature data item having been less frequently used are to be performed only on an additionally registered feature data item assigned a registration ID of a number larger than 1.

As described above, according to the fourth embodiment, even when the number of feature data items that can be registered in the person database section 108 is limited, it is possible to increase the frequency of registered persons being capable of being identified.

Next, a description will be given of a personal identification device according to a fifth embodiment of the present invention. In the fifth embodiment, in performing additional registration described in the first embodiment, it is determined whether or not a face area is appropriate for additional registration.

Figure 8:
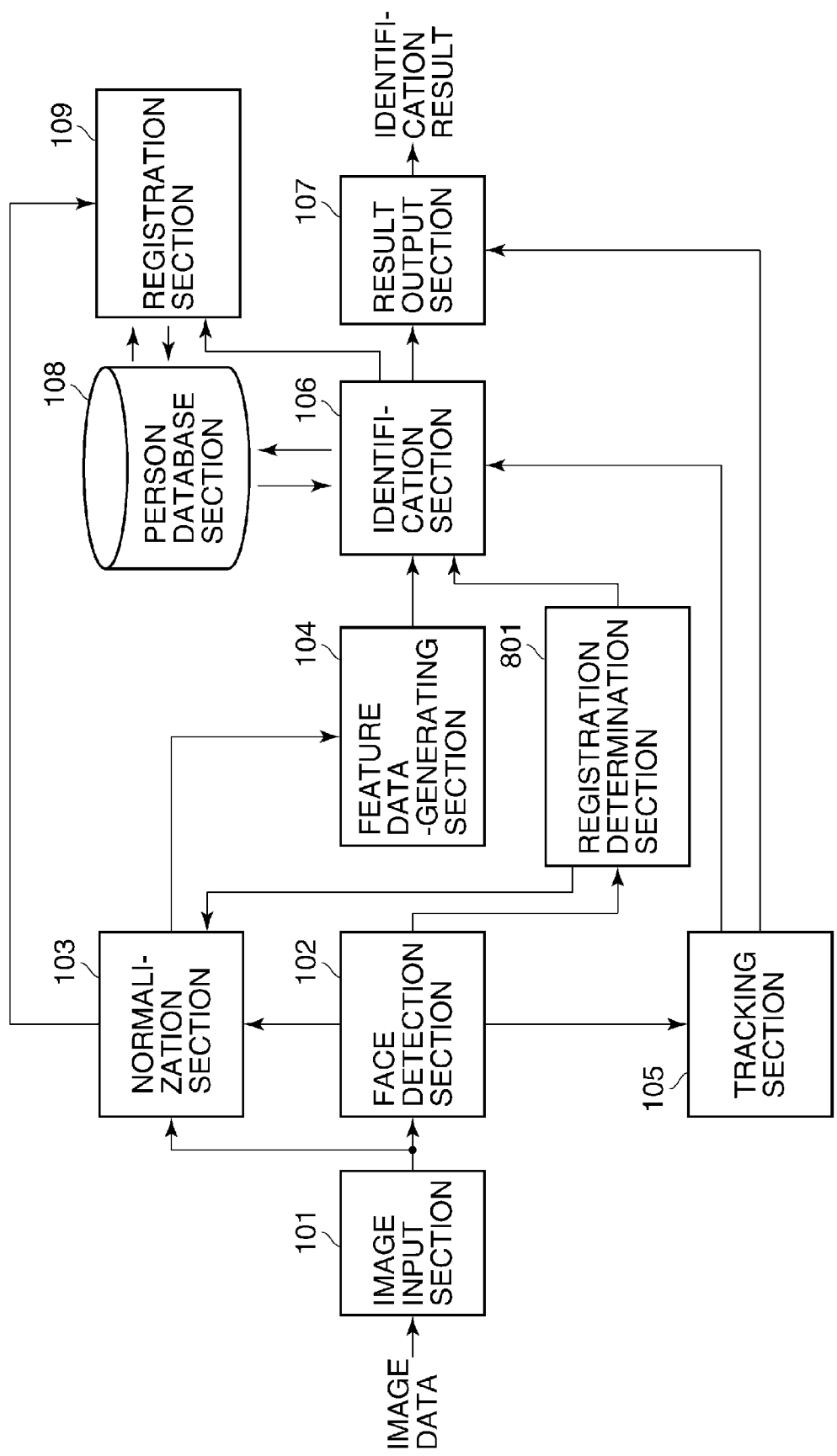
FIG. 8 is a block diagram of a personal identification device according to a fifth embodiment of the present invention.

FIG. 8 is a block diagram of an example of the personal identification device according to the fifth embodiment. Note that component elements of the personal identification device of the present embodiment which are identical to those of the personal identification device shown in FIG. 1 are denoted by identical reference numerals, and description thereof is omitted.

As distinct from the personal identification device of the first embodiment shown in FIG. 1, the personal identification device of the fifth embodiment shown in FIG. 8 includes a registration determination section 801 (determination unit). The face detection section 102 is connected to the identification section 106 via the registration determination section 801. Further, the registration determination section 801 is connected to the normalization section 103.

As described with reference to FIG. 1, the face detection section 102 detects the location and size of a face area of a person from image data and generates face area detection data. At this time, the face detection section 102 also outputs associated detection data described hereinafter. The registration determination section 801 determines, based on the face area detection data and the associated detection data, whether or not a face area is appropriate for additional registration, as described hereinafter.

If the registration determination section 801 determines that the face area is appropriate for additional registration, the identification section 106 delivers feature data associated with the face area detection data to the registration section 109. Then, the registration section 109 additionally registers the feature data in the person database section 108 together with normalized face image data.

On the other hand, if the registration determination section 801 determines that the face area is not appropriate for additional registration, the identification section 106 does not perform additional registration irrespective of determination as to whether or not additional registration is to be performed based on a result of comparison and collation.

Referring to FIG. 8, when it is determined by the registration determination section 801 that the face area is appropriate for additional registration, the normalization section 103 normalizes the face area detection data. When it is determined by the registration determination section 801 that the face area is not appropriate for additional registration, the normalization section 103 does not perform normalization of the face area detection data. This inhibits the feature data-generating section 104 and the identification section 106 from executing processing.

In the personal identification device shown in FIG. 8, the identification section 106 calculates the absolute value sum S of differences in coordinates between feature points, as described with reference to FIG. 1, to thereby perform personal identification. As the absolute value sum S is smaller, the identification section 106 determines that there is a higher possibility that a person for detection (i.e. a face area) (i.e. the face area) and a person registered in advance are identical to each other. On the other hand, as the absolute value sum S is larger, the identification section 106 determines that there is a higher possibility that the person for detection (face area) and the person registered in advance are different from each other.

By the way, even when the person for detection and the person registered in advance are identical each other, the absolute value sum S varies. This occurs e.g. for the following two reasons: A first reason is that a change in a person's face state including facial expressions and a face facing direction, and an environmental change, such as a change of a lighting condition, influence the feature points, and a second reason is that erroneous detection of feature points occurs e.g. when a person faces sideways or when an object that hides a face area exists.

In the above-described first embodiment, when the absolute value sum S becomes larger for the same person, i.e. when the absolute value sum S has changed due to the above-described reasons, feature data is additionally registered in the person database section 108 together with normalized face image data. This causes feature data items corresponding to various changes in the same person to be registered, which improves accuracy in identification in the case of a change caused by the above-mentioned first reason.

However, in the first embodiment, additional registration of feature data is executed even in the case of a change caused by the second reason, whereby feature data of a face facing just sideways or a face partially hidden by an obstacle is also registered in the person database section 108.

Figure 9A:
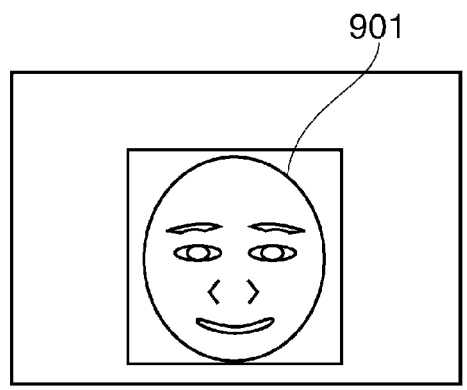
Figure 9B:
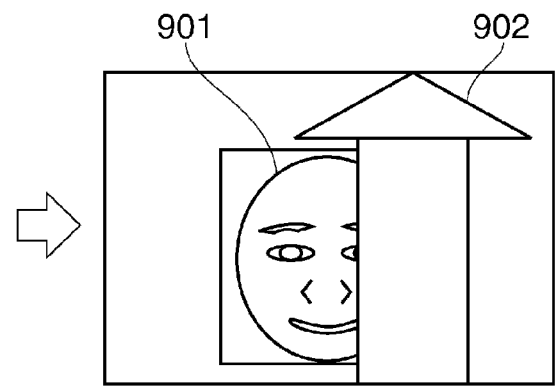
Figure 9C:
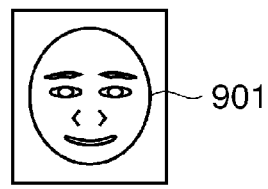

FIGS. 9A to 9C are views useful in explaining additional registration executed by the personal identification device shown in FIG. 1. FIG. 9A illustrates one frame of moving image data, and FIG. 9B illustrates an example of a frame succeeding the FIG. 9A frame. Further, FIG. 9C illustrates an example of data registered in the person database section 108 appearing in FIG. 1.

It is assumed that the face area of a person 901 in FIG. 9A is determined to be identical to the face area of a person 901 (FIG. 9C) detected in a preceding frame and already registered in the person database section 108. More specifically, since the absolute value sum S between the face area of the FIG. 9A person 901 and that of the FIG. 9C person 901 is small, it is determined that the FIG. 9A person 901 and the FIG. 9C person 901 are identical to each other.

At this time, it is determined that there is no change between face area detection data and feature data on the FIG. 9A person 901 and face area detection data and feature data registered in the person database section 108. As a consequence, it is determined that the face area detection data and feature data on the FIG. 9A person 901 are not required for additional registration.

Now, let it be assumed that the person 901 is partially hidden by an obstacle 902 as shown in FIG. 9B. In this case, the absolute value sum S of differences between the face area of a person 901 in FIG. 9B and that of the FIG. 9C person 901 is increased. As a consequence, the FIG. 9B person 901 and the FIG. 9C person 901 can be determined to be different from each other though they are actually the same person.

Therefore, the face area detection data and feature data on the FIG. 9B person 901 are determined to be different from the face area detection data and the feature data registered in the person database section 108. This requires the face area detection data and feature data on the FIG. 9B person 901 to be additionally registered. However, when feature data, such as the feature data on the FIG. 9B person 901, which includes feature points difficult to calculate for personal identification is additionally registered, accuracy in identification can be degraded. Therefore, it is not preferable to perform additional registration of such feature data.

To prevent such additional registration, according to the personal identification device shown in FIG. 8, the registration determination section 801 determines, based on face area detection data and associated detection data, whether or not a face area is suitable for registration in the person database section 108. If the face area is not appropriate for additional registration, the registration determination section 801 determines that the feature data is not required for additional registration.

The registration determination section 801 performs the determination using e.g. face facing direction information indicative of the facing direction of a face, the reliability degree of a face detection result, and the size of a face area, as the associated detection data. The term "reliability degree of a face detection result" is intended to mean a certainty of a face area detection data as a face. A case where the reliability degree of a face detection result is low includes a case where face area detection data contains an obstacle or the like. For this reason, when the reliability degree of a face detection result is lower than a predetermined reliability threshold value, it is determined that the face area is not appropriate for additional registration.

Further, when the size of a face area is small, the face area may not provide a sufficient resolution as feature data for use in comparison and collation by the identification section 106. Therefore, when the size of a face area is smaller than a predetermined size threshold value, it is determined that the face area is not appropriate for additional registration.

Furthermore, when an angle of the face facing direction (i.e. an angle of the facing direction of a face with respect to the facing direction of the face facing toward the front, i.e. the viewer's side) is large e.g. in a case where the face is facing sideways, sufficient feature data for personal identification by the identification section 106 is sometimes not obtained, differently from a case where the face faces e.g. toward the front and the angle of the face facing direction is small. Therefore, when the angle of the face facing direction is larger than a predetermined direction threshold value (angle threshold value), it is determined that the face area is not appropriate for additional registration.

FIG. 10 is a flowchart of a personal identification and database update process executed by the personal identification device shown in FIG. 8. In FIG. 8, steps identical to those in the FIG. 4 personal identification and database update process are denoted by identical step numbers.

Referring to FIGS. 8 and 10, if it is determined in the step S202, as in FIG. 4, that at least one face area could be detected (YES to the step S202), the registration determination section 801 determines as to face area detection data, based on associated detection data, whether or not the face area detection data, i.e. the face area is appropriate for additional registration (step S901). The determination by the registration determination section 801 is performed on each of face area detection data items, i.e. on each of face areas.

If it is determined by the registration determination section 801 that the face area is appropriate for additional registration (YES to the step S901), the normalization section 103 normalizes the face area detection data in the step S203, as described with reference to FIG. 1. Thereafter, in the step S204, the feature data-generating section 104 extracts feature data.

Then, the registration determination section 801 checks whether or not the determination has been performed on all face area detection data items (step S902). If the determination has been performed on all face area detection data items (YES to the step S902), the step S205 described with reference to FIG. 1 is executed. On the other hand, if the determination has not been performed on all the face area detection data items (NO to the step S902), the process returns to the step S901.

If the registration determination section 801 determines that the face area is not appropriate for additional registration (NO to the step S901), the process proceeds to the step S902. When the face area is not appropriate for additional registration, the face area detection data is difficult to extract feature points for personal identification, and hence the steps S203 and S204 are not executed.

The step S205 and the following steps S206 to S212 are identical to those in FIG. 4, and therefore description thereof is omitted.

The personal identification process is executed in the step S207 as described with reference to FIG. 3. In the personal identification device shown in FIG. 8, the identification section 106 determines in the step S301 whether or not feature data associated with the personal figure ID has been detected in a frame being currently processed. In the present embodiment, a case where feature data has not been detected includes not only a case where the face detection section 102 cannot detect any face area but the tracking section 105 determines an area where there is a face by tracking, but also a case where it is determined by the registration determination section 801 that the face area is not appropriate for additional registration.

Further, in the step S302, the identification section 106 performs personal identification through comparison and collation processing, and this comparison and collation processing requires processing time. However, when the registration determination section 801 determines that face area is not appropriate for additional registration, the comparison and collation processing is not executed, so that it is possible to reduce processing time.

As described above, according to the fifth embodiment, in the case of performing additional registration, whether or not a face area is appropriate for additional registration is determined, and only when the face area is determined to be appropriate for additional registration, the face area detection data and feature data associated therewith are registered. Thus, accuracy in personal identification can be improved.

Further, since face area detection data of a face area determined to be inappropriate for additional registration is not subjected to comparison and collation processing, it is possible to perform comparison and collation processing efficiently.

Next, a description will be given of a personal identification device according to a sixth embodiment of the present invention.

Figure 11:
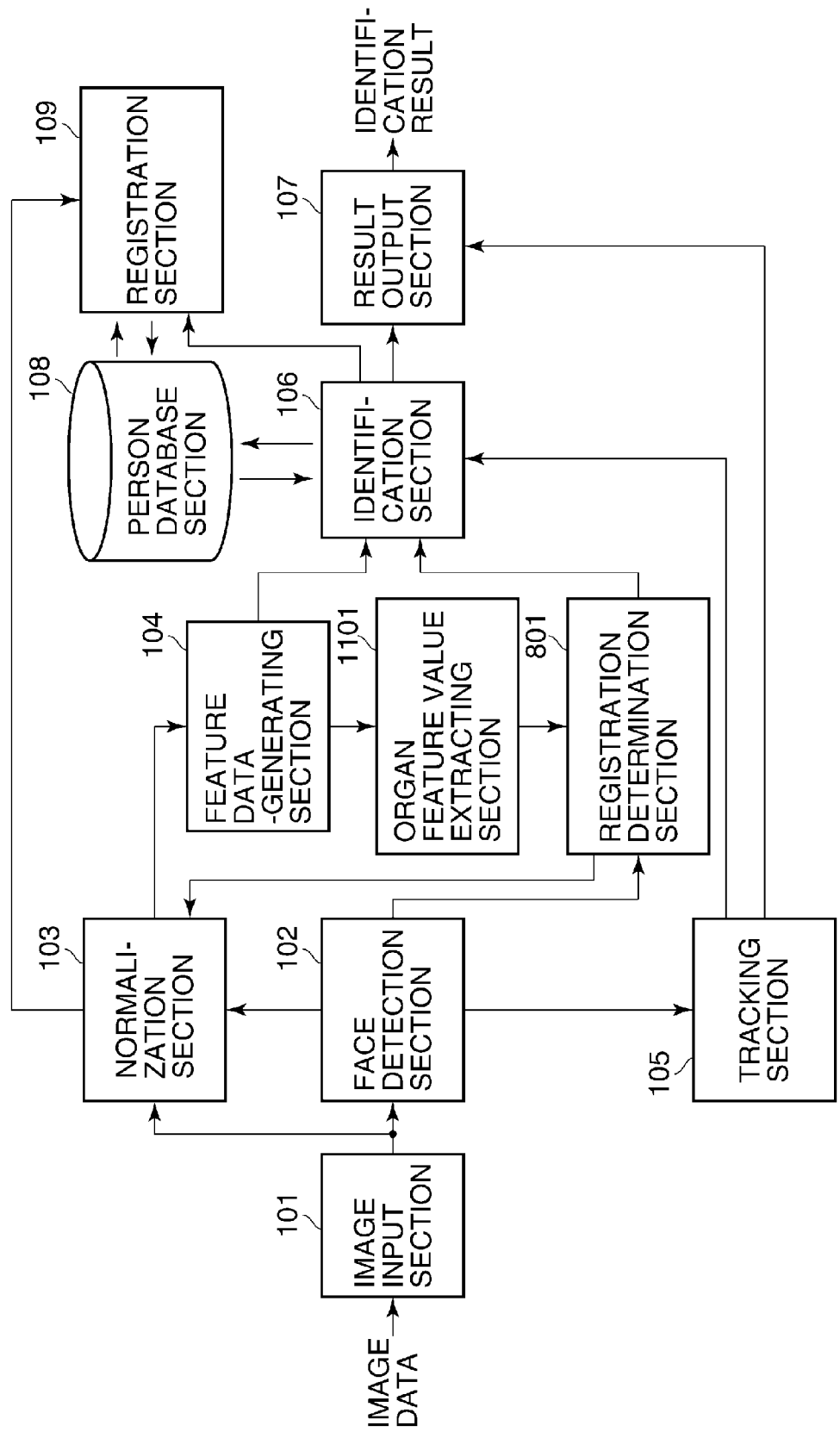
FIG. 11 is a block diagram of a personal identification device according to a sixth embodiment of the present invention.

FIG. 11 is a block diagram of the personal identification device according to the sixth embodiment.

In FIG. 11, component elements identical to those of the personal identification device of the fifth embodiment shown in FIG. 8 are denoted by identical reference numerals, and description thereof is omitted. As distinct from the personal identification device according to the fifth embodiment shown in FIG. 8, the personal identification device of the sixth embodiment shown in FIG. 11 further includes an organ feature value extracting section 1101 (organ feature value extracting unit).

In the personal identification device shown in FIG. 11, the organ feature value extracting section 1101 extracts opening/closing degree information indicative of the degree of opening/closing of eyes and face facing direction information indicative of an angle of the face facing direction as organ feature information (also referred to as "organ feature value") from feature data (extracted feature data) extracted by the feature data-generating section 104. Then, the organ feature value extracting section 1101 delivers the organ feature information to the registration determination section 801.

The registration determination section 801 determines, using the organ feature information along with face area detection data and associated detection data delivered from the face detection section 102, whether or not the face area detection data and the feature data are appropriate for additional registration in the person database section 108. If the registration determination section 801 determines that the face area detection data and the feature data are appropriate for the additional registration, the identification section 106 handles the face area detection data and the feature data as data for additional registration. On the other hand, if the registration determination section 801 determines that the face area detection data and the feature data are not appropriate for the additional registration, the identification section 106 handles the face area detection data and the feature data as data inappropriate for additional registration, without performing comparison and collation for determination as to whether or not additional registration is to be performed.

By the way, in the personal identification device described with reference to FIG. 8, the registration determination section 801 uses associated detection data to determine face area detection data from which it is difficult to obtain feature points for personal identification. When it is difficult to obtain feature points, it is determined that the face area detection data is determined not to be additionally registered. Thus, in the personal identification device shown in FIG. 8, only face area detection data from which feature data including feature points can be properly obtained is additionally registered in the person database section 108.

In the FIG. 8 personal identification device, even if it is determined that feature data can be properly obtained from a face area detection data item, the face area detection data item is not necessarily suitable for personal identification. For example, when eyes are closed or when the angle of the face facing direction (with respect to the facing direction toward the front) is large e.g. in a case where the face faces sideways, feature data obtained from the face area detection data item does not sufficiently reflect features of a person, so that personal identification may not be properly performed even by the use of the feature data.

To solve this problem, in the personal identification device shown in FIG. 11, the registration determination section 801 not only performs the determination using the associated detection data, but also determines, using the organ feature information, whether or not the face area is appropriate for additional registration in the person database section 108. The determination is thus performed using the organ feature information indicative of the opening/closing degree of eyes and the face facing direction, whereby the identification section 106 can accurately exclude such a face area detection data item insufficient for personal identification, from an object to be additionally registered. In short, the FIG. 11 personal identification device makes it possible to further improve identification accuracy than the FIG. 8 personal identification device.

Now, a description will be given of extraction of the organ feature information. First, a normalized face image data item obtained by normalizing a face area detection data item detected by the face detection section 102 is delivered to the feature data-generating section 104. The feature data-generating section 104 fits a three-dimensional model of a face to the normalized face image data item and extracts the feature points to thereby obtain feature data. The organ feature value extracting section 1101 obtains organ feature information indicative of an eye opening/closing degree and a face facing direction according to the geometric relationship between the feature points of the feature data.

By the way, in the FIG. 8 personal identification device, the face detection section 102 detects a face area from image data and outputs the detected face area as face area detection data together with associated detection data. The associated detection data contains face facing direction information as mentioned hereinbefore. The face facing direction information contained in the associated detection data is obtained from face area detection data e.g. by using a plurality of identifying elements in association with respective face facing directions, such as facing directions of a front face and a side face, and discriminating an identifying element which has detected a face facing direction.

On the other hand, the organ feature value extracting section 1101 obtains face facing direction information from feature data output from the feature data-generating section 104 by the method described above. For this reason, the face facing direction information obtained by the organ feature value extracting section 1101 contains more detailed features extracted from the feature data, and hence is higher in accuracy than the face facing direction information contained in the associated detection data.

The above-mentioned organ feature information (i.e. information indicative of an eye opening/closing degree and a face facing direction) is utilized for determination as follows: When the eye opening/closing degree is small e.g. in an eye-closed state, a case can occur where it is sometimes impossible to obtain sufficient feature data for the identification section 106 to perform personal identification, differently from a case where the eye opening/closing degree is large. Therefore, when the eye opening/closing degree is smaller than a predetermined opening/closing threshold value, the registration determination section 801 determines that the face area is not appropriate for additional registration in the person database section 108.

Further, when the face facing direction (angle) is large e.g. in a case where a face faces sideways, it is sometimes impossible to obtain sufficient feature data for the identification section 106 to perform personal identification, differently from a case where the face facing direction (angle) is small. Therefore, when the angle of the face facing direction is larger than a predetermined angle threshold value, the registration determination section 801 determines that the face area is not appropriate for additional registration.

Figure 12:
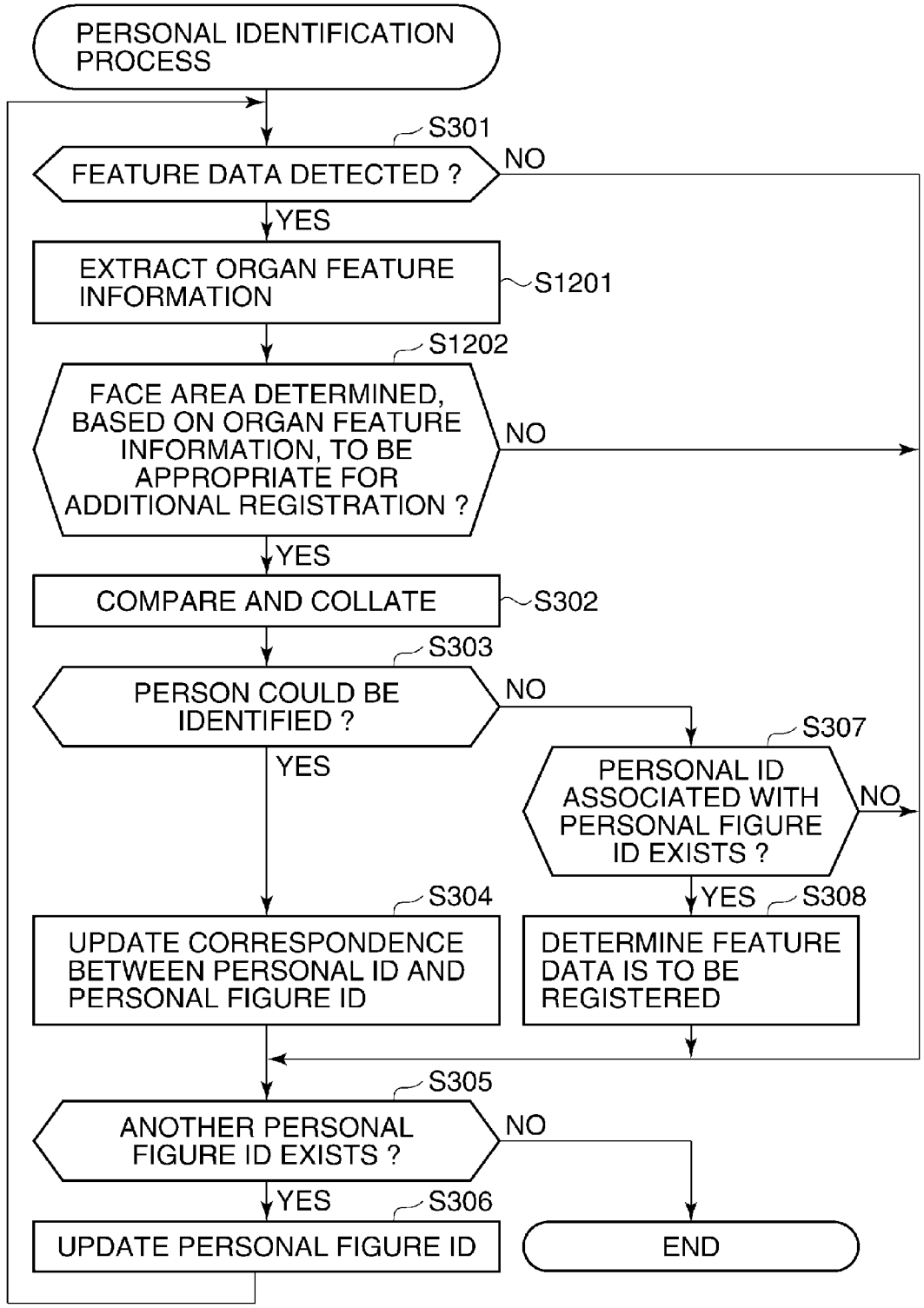
FIG. 12 is a flowchart of a personal identification process executed by the personal identification device in FIG. 11.

FIG. 12 is a flowchart of a personal identification process executed by the FIG. 11 personal identification device of the sixth embodiment. In FIG. 12, steps identical to those in the FIG. 6 personal identification process are denoted by identical step numbers, but some steps denoted by identical step numbers are executed by different processing elements.

Referring to FIGS. 11 and 12, in the personal identification process, the organ feature value extracting section 1101 determines whether or not a feature data item associated with a personal figure ID has been detected in a frame being currently processed (step S301). If a feature data item has been detected (YES to the step S301), the organ feature value extracting section 1101 extracts organ feature information indicative of an eye opening/closing degree and a face facing direction from the feature data item associated with the personal figure ID (step S1201).

Then, the registration determination section 801 determines, based on the organ feature information delivered from the organ feature value extracting section 1101, whether or not a face area detected by the face detection section 102 is appropriate for additional registration (step S1202).

If the registration determination section 801 determines that the face area is appropriate for additional registration (YES to the step S1202), the identification section 106 performs comparison and collation in the step S302 described with reference to FIG. 6. On the other hand, if the registration determination section 801 determines that the face area is inappropriate for additional registration (NO to the step S1202), the identification section 106 determines whether or not there remains a face area in the frame being currently processed, which has been assigned a personal figure ID by the tracking section 105 and not yet subjected to identification (step S305). In short, the process skips over the steps S302, S303, S304, S307, and S308 to the step S305.

Note that the steps S302, S303, S304, S306, S307, and S308 were described with reference to FIG. 6, and therefore description thereof is omitted.

As described above, according to the personal identification device of the sixth embodiment, not only is processing using associated detection data performed as described with reference to FIG. 10, but also it is determined, using organ feature information indicative of an eye opening/closing degree and a face facing direction, whether or not a face area is appropriate for additional registration. This makes it possible to additionally register only a face area detection data item and feature data associated therewith suitable for additional registration with high accuracy to thereby improve identification accuracy.

Further, when it is determined that a face area is inappropriate for additional registration, processing by the identification section 106 is omitted, which makes it possible to perform identification processing efficiently.

Although in the sixth embodiment, the registration determination section 801 uses associated detection data and organ feature information to determine whether or not a face area is appropriate for additional registration, the registration determination section 801 may perform the determination using other information. For example, the reliability degree of feature data obtained by the feature data-generating section 104 may be used. In this case, when the reliability degree of feature data is low, the reliability degree of organ feature information obtained based on the feature data and that of the result of identification by the identification section 106 are also low. Therefore, when the reliability degree of feature data is lower than the predetermined reliability threshold value, the registration determination section 801 determines that a face area is inappropriate for additional registration.

As is apparent from the above description, the image input section 101 and the face detection section 102 function as a face detection unit, and the normalization section 103 and the feature data-generating section 104 function as a feature data extracting unit. Further, the identification section 106 and the registration section 109 collectively function as a registration unit.

Although in the above-described embodiments, personal identification is performed using a human face area, this is not limitative. If a function of detecting a face area of a pet animal, which is incorporated in some types of digital cameras, is utilized, it is possible to execute the same processing as described above for individual identification of an animal.

Note that the present invention is not limited to the above-described embodiments, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a storage medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-140529, filed Jun. 21, 2010, Japanese Patent Application No. 2011-050037, filed Mar. 8, 2011 which are hereby incorporated by reference herein in their entirety.

What is claimed is:

1. An identification device that performs identification according to a face area contained in image data, comprising:
a feature data extraction unit configured to extract feature data from a face area in each of a plurality of frames of image data, as extracted feature data;

a storage unit configured to register therein feature data for use in the identification;

an identification unit configured to perform identification through comparison between the feature data registered in said storage unit and the extracted feature data, and to identify the extracted feature data and the feature data registered in said storage unit as being associated with an identical person or individual when a difference between the extracted feature data and the feature data registered in said storage unit is smaller than a second threshold value which is smaller than a first threshold value;

a tracking unit configured to identify an identical face area in consecutive ones of the frames; and a registration unit configured to be operable when said identification unit identifies a face area in a first frame as one of the frames, but said identification unit does not identify a face area in a second frame following the first frame, which is identified by said tracking unit as identical to the identified face area in the first frame, and when said identification unit determines that the difference is larger than the first threshold value in the second frame, to register the extracted feature data associated with the face area in the second frame, as additional feature data, in said storage unit.

2. The identification device according to claim 1, further comprising a face detection unit configured to receive image data having a plurality of frames, detect a face area in each of the frames, and output associated detection data including at least face facing direction information indicative of a face facing direction in the face area, and a determination unit configured to determine, based on the associated detection data, whether or not the face area is appropriate for additional registration of the extracted feature data associated therewith, and wherein when said determination unit determines that the face area is appropriate for additional registration of the extracted feature data associated therewith, said registration unit registers the extracted feature data as the additional feature data in said storage unit.

3. The identification device according to claim 2, wherein when an angle indicative of the face facing direction is larger than a predetermined angle threshold value, said determination unit determines that the face area is not appropriate for additional registration of the extracted feature data.

4. The identification device according to claim 3, wherein the associated detection data further contains information indicative of at least one of a reliability degree of a face detection result and a size of a face area, and wherein at least one of a condition that the reliability degree is lower than a predetermined reliability threshold value and a condition that the face area size is smaller than a predetermined size threshold value is satisfied, said determination unit determines that the face area is not appropriate for additional registration of the extracted feature data associated therewith.

5. The identification device according to claim 2, further comprising an organ feature value extraction unit configured to extract at least organ feature information including opening/closing degree information indicative of an eye opening/closing degree in the face area from the extracted feature data, and wherein when the eye opening/closing degree is lower than a predetermined opening/closing degree threshold value, said determination unit determines that the face area is not appropriate for additional registration of the extracted feature.

6. The identification device according to claim 5, wherein the organ feature information includes face facing direction information indicative of an angle of a face facing direction in the face area, and wherein when the angle of the face facing direction is larger than a predetermined angle threshold value, said determination unit determines that the face area is not appropriate for additional registration of the extracted feature data associated therewith.

7. The identification device according to claim 2, wherein when said determination unit determines that the face area is not appropriate for additional registration of the extracted feature data associated therewith, said identification unit does not perform the identification processing on the extracted feature data.

8. The identification device according to claim 1, wherein said tracking unit determines, based on face central positions and face sizes in face areas in respective different frames, whether or not the face areas are identical to each other.

9. The identification device according to claim 1, wherein said identification unit performs the identification using the feature data registered in said storage unit in advance for the identification, and when identification cannot be performed using the feature data registered in said storage unit in advance, said identification unit further executes the identification using the additional feature data.

10. The identification device according to claim 1, wherein before execution of the identification by said identification unit, said registration unit registers a frequency of utilization of the feature data registered in said storage unit, in said storage unit, and wherein in a case where a number of feature data items that can be registered in said storage unit has reached a predetermined upper limit when the additional feature data is to be registered anew, said registration unit deletes a feature data item having been utilized less frequently and registers the additional feature data.

11. An identification method performed by an identification device that performs identification according to a face area contained in image data and is provided with a storage unit in which feature data associated with a face area for use in the identification is registered as registered feature data, comprising:

extracting feature data from a face area in each of a plurality of frames of image data, as extracted feature data;

performing identification through comparison between the feature data registered in the storage unit and the extracted feature data, and identifying the extracted feature data and the feature data registered in said storage unit as being associated with an identical person or individual when a difference between the extracted feature data and the feature data registered in said storage unit is smaller than a second threshold value which is smaller than a first threshold value;

identifying an identical face area in consecutive ones of the frames; and registering, when a face area in a first frame as one of the frames is identified, but a face area in a second frame following the first frame, which is identified as identical to the identified face area in the first frame, is not identified, and when the difference is larger than the first threshold value in the second frame, the extracted feature data associated with the face area in the second frame, as additional feature data, in the storage unit.

12. The identification method according to claim 11, including detecting a face area in each of the frames of the image data having a plurality of frames and outputting associated detection data including at least face facing direction information indicative of a face facing direction in the face area, and determining, based on the associated detection data, whether or not the face area is appropriate for additional registration of the extracted feature data associated therewith, and wherein the registration is performed when it is determined that the face area is appropriate for additional registration of the extracted feature data associated therewith.

13. A non-transitory computer-readable storage medium storing a computer-executable program for causing a computer to execute an identification method used by for an identification device that performs identification according to a face area contained in image data and is provided with a storage unit in which feature data associated with a face area for use in the identification is registered as registered feature data, wherein the identification method comprises:

extracting feature data from a face area in each of a plurality of frames of image data, as extracted feature data;

performing identification through comparison between the feature data registered in the storage unit and the extracted feature data, and identifying the extracted feature data and the feature data registered in said storage unit as being associated with an identical person or individual when a difference between the extracted feature data and the feature data registered in said storage unit is smaller than a second threshold value which is smaller than a first threshold value;

identifying an identical face area in consecutive ones of the frames; and registering, when a face area in a first frame as one of the frames is identified but a face area in a second frame following the first frame, which is identified as identical to the identified face area in the first frame, is not identified, and when the difference is larger than the first threshold value in the second frame, the extracted feature data associated with the face area in the second frame, as additional feature data, in the storage unit.

14. The non-transitory computer-readable storage medium according to claim 13, wherein the identification method includes:

detecting a face area in each of the frames of the image data having a plurality of frames and outputting associated detection data including at least face facing direction information indicative of a face facing direction in the face area, and determining, based on the associated detection data, whether or not the face area is appropriate for additional registration of the extracted feature data associated therewith, and wherein the registration is performed when it is determined that the face area is appropriate for additional registration of the extracted feature data associated therewith.

* * * * *